United States Patent
Unno

(10) Patent No.: US 6,788,487 B2
(45) Date of Patent: Sep. 7, 2004

(54) MAGNETIC TAPE APPARATUS AND MAGNETIC TAPE ACCESSING METHOD

(75) Inventor: Satoshi Unno, Tokyo (JP)

(73) Assignee: NEC Corporation, Tokyo (JP)

( * ) Notice: Subject to any disclaimer, the term of this patent is extended or adjusted under 35 U.S.C. 154(b) by 261 days.

(21) Appl. No.: 10/020,395

(22) Filed: Dec. 18, 2001

(65) Prior Publication Data

US 2002/0075589 A1 Jun. 20, 2002

(30) Foreign Application Priority Data

Dec. 20, 2000 (JP) ........................................ 2000-386750

(51) Int. Cl.$^7$ .............................................. G11B 19/02
(52) U.S. Cl. ...................................... 360/72.1; 360/53
(58) Field of Search .................................. 360/72.1, 53

(56) References Cited

U.S. PATENT DOCUMENTS 6,055,602 A * 4/2000 McIlvain et al. ............ 711/112
6,490,114 B1 * 12/2002 Gill et al. ................... 360/72.2
6,603,626 B1 * 8/2003 Takayama ................ 360/73.04

FOREIGN PATENT DOCUMENTS

| JP | 4-563349 B2 | 9/1992 |
| JP | 4-285783 A | 10/1992 |
| JP | 5-128736 A | 5/1993 |
| JP | 6-325436 A | 11/1994 |
| JP | 7-111037 A | 4/1995 |
| JP | 8-55-463 A | 2/1996 |
| JP | 9-237474 A | 9/1997 |

* cited by examiner

*Primary Examiner*—David Hudspeth
*Assistant Examiner*—Mitchell Slavitt
(74) *Attorney, Agent, or Firm*—Sughrue Mion, PLLC

(57) ABSTRACT

In a magnetic tape drive for accessing a magnetic tape contained in a memory built-in cartridge, a logical beginning of tape is assigned and updated for the magnetic tape that is being accessed. The quality of data that is read from the magnetic tape is monitored and the number of times the magnetic tape has been accessed is recorded. It is determined whether the quality of data that is read and the number of times the magnetic tape has been accessed satisfy predetermined criteria. When the criteria are satisfied, the logical beginning of tape is caused to be updated. Information on the logical beginning of tape position of the magnetic tape is stored to the built-in memory. When the magnetic tape is loaded, the information on the logical beginning of tape position of the magnetic tape is read from the built-in memory.

6 Claims, 3 Drawing Sheets

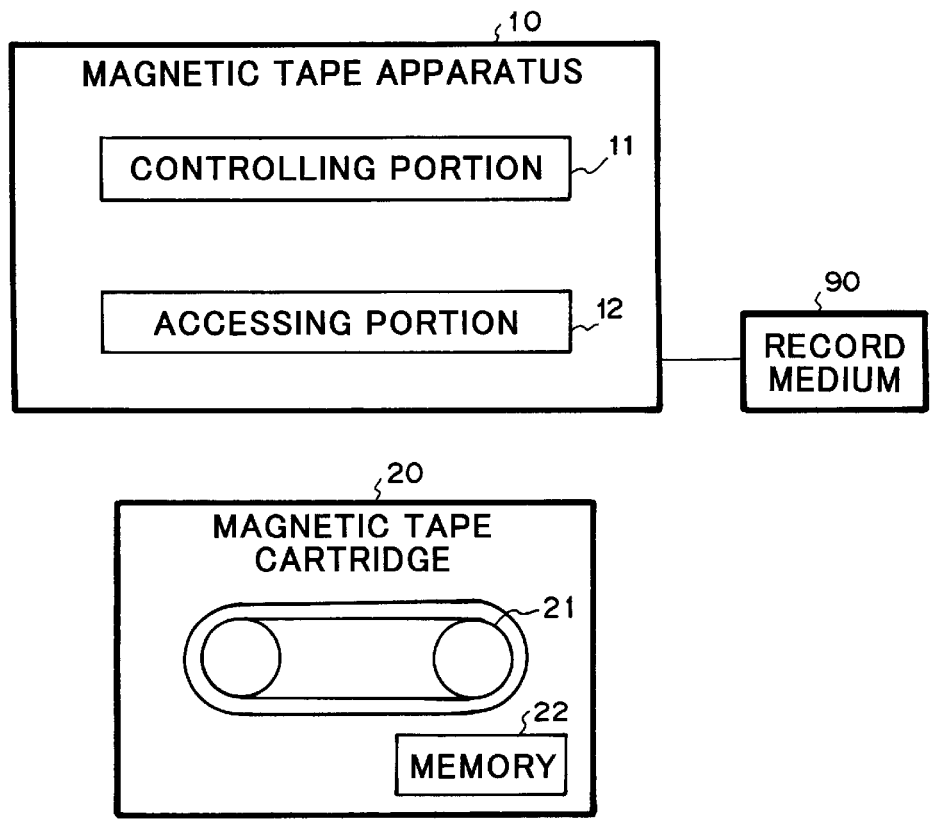
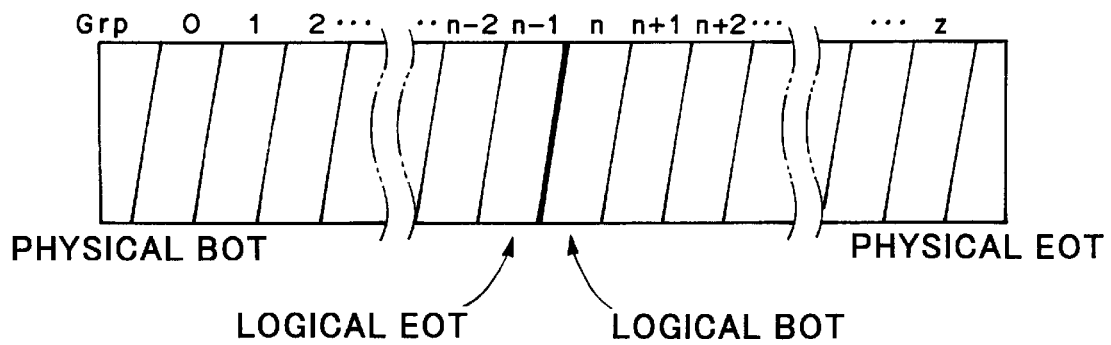

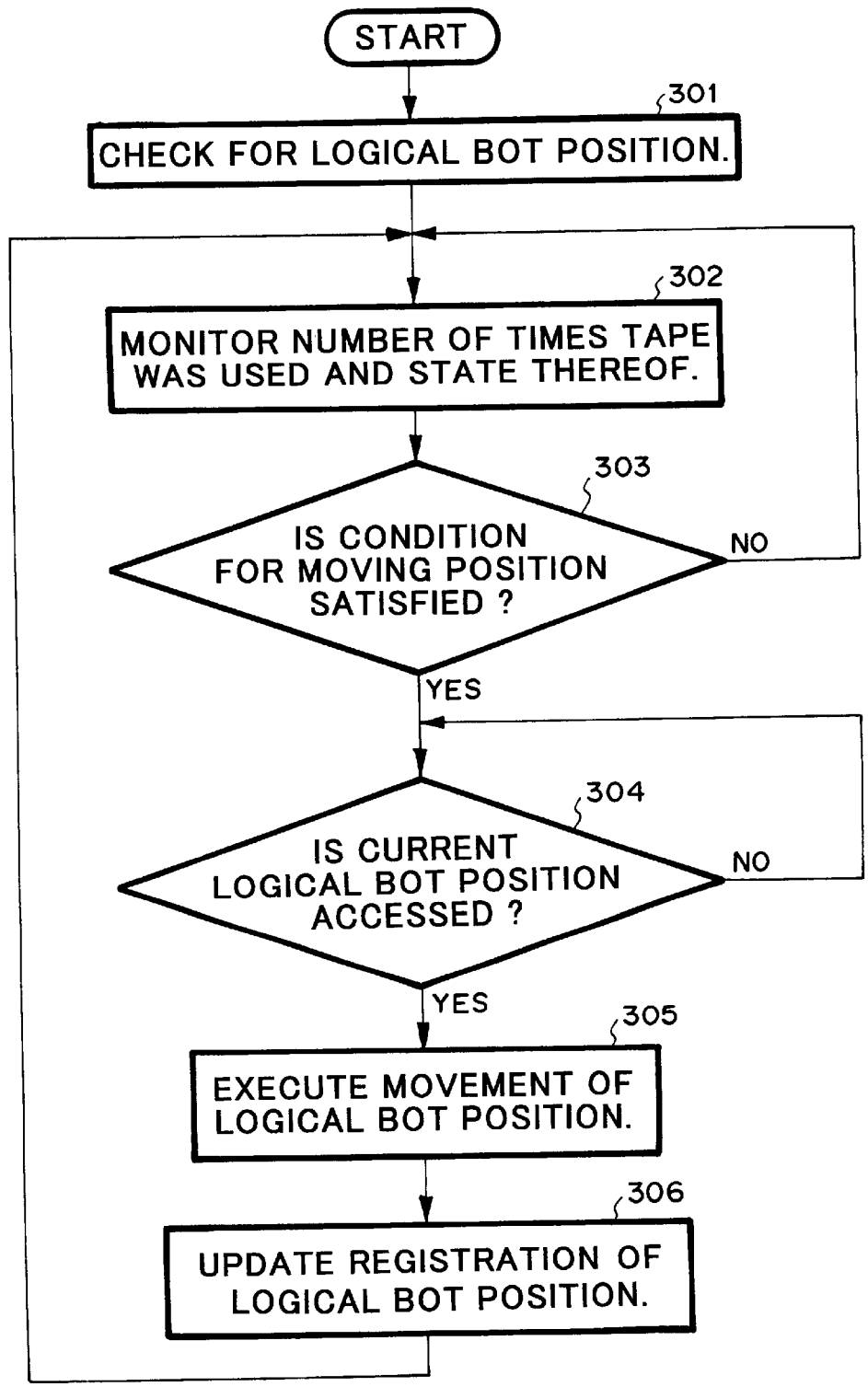

MAGNETIC TAPE APPARATUS AND MAGNETIC TAPE ACCESSING METHOD

BACKGROUND OF THE INVENTION

1. Field of the Invention

The present invention relates to a magnetic tape apparatus, and in particular, a magnetic tape apparatus and a recording method for adequately controlling accesses to a magnetic tape so as to prevent a particular position thereof from being intensively accessed.

2. Description of the Prior Art

In a conventional magnetic tape apparatus, logical beginning of tape (BOT) that is the start position of record data is used as physical beginning of tape.

Various types of information about record data are recorded from the beginning. When the taps is loaded to the apparatus, the information is read. When the tape is to be unloaded from the apparatus, the tape is rewound beforehand. In the case of a DAT (Digital Audio Tape) apparatus, various types of information are written to a beginning portion of a data area as a vendor group. In most backup software programs, header information such as a tape name and date of creation managed by the software program is written to a beginning block. When a tape is loaded or a backup software program is started, the vendor group or the header information is read.

In addition, there are several types of magnetic tapes that are for example cartridge type and open reel type. In addition, one type of cartridge magnetic tapes has a memory that stores system information.

As was described above, in the conventional magnetic tape apparatus, since the number of times a particular position such as the beginning portion of the magnetic tape has been accessed is much larger than the number of times the other portion has been accessed. Thus, the tape is not effectively used. Since the particular portion is quickly worn out, the life of the tape shortens.

SUMMARY OF THE INVENTION

Therefore, an object of the present invention is to solve the problem of the prior art and to provide a magnetic tape apparatus and a recording method for sequentially moving a logical BOT (not limited to a physical BOT) so as to averagely and effectively use the entire magnetic tape.

According to a first aspect of the present invention, there is provided a magnetic tape apparatus for accessing a magnetic tape, the apparatus comprising: means for assigning a logical beginning of tape position on the magnetic tape and updating the logical beginning of tape position, the logical beginning of tape position being different from a physical beginning of tape position of the magnetic tape; and means for recording system information to the logical beginning of tape position.

In the magnetic tape apparatus, a logical end of tape position may be the same as a physical end of tape position on the magnetic tape.

The magnetic tape apparatus may further comprise: means for assigning a logical end of tape position on the magnetic tape and updating the logical end of tape position.

In the magnetic tape apparatus, the logical end of tape position may be adjacent to the logical beginning of tape position.

The magnetic tape apparatus may further comprise: means for measuring an error rate of data read from the magnetic tape and the number of times the magnetic tape has been accessed, wherein when the error rate exceeds a predetermined value and/or the number of times the magnetic tape has been accessed exceeds a predetermined value, the logical beginning of tape position may be updated.

In the magnetic tape apparatus, an updated logical beginning of tape position may be apart from the last logical beginning of tape in a predetermined direction by a predetermined distance.

In the magnetic tape apparatus, the magnetic tape may be contained in a cartridge which has a memory, and the apparatus may further comprise: means for writing/reading information on the logical beginning of tape position to/from the memory.

In the magnetic tape apparatus, a first group at the logical beginning of tape may be a vendor group, and the apparatus may further comprise: means for reading information on the logical beginning of tape position from the memory and reading information in the vendor group on the basis of the information on the logical beginning of tape position when the cartridge is loaded to the magnetic tape apparatus.

In the magnetic tape apparatus, the magnetic tape apparatus may use helical scan method.

According to a second aspect of the present invention, there is provided a magnetic tape cartridge having a cartridge, a magnetic tape, and a memory, wherein a logical beginning of tape is recorded to the magnetic tape, and wherein information on the logical beginning of tape position is written to the memory.

In the magnetic tape cartridge, data may be written on the magnetic tape by helical scan method.

These and other objects, features and advantages of the present invention will become more apparent in light of the following detailed description of the best mode embodiment thereof, as illustrated in the accompanying drawings.

BRIEF DESCRIPTION OF DRAWINGS

FIG. 1 is a schematic diagram showing the structures of a magnetic tape apparatus and a magnetic tape cartridge according to a first embodiment of the present invention;

FIG. 2 is a schematic diagram showing an example of a data recording format on a magnetic tape according to the first embodiment of the present invention;

FIG. 3 is a flow chart for explaining a process performed by the magnetic tape apparatus according to the first embodiment of the present invention.

DESCRIPTION OF PREFERRED EMBODIMENTS

Figure 4:
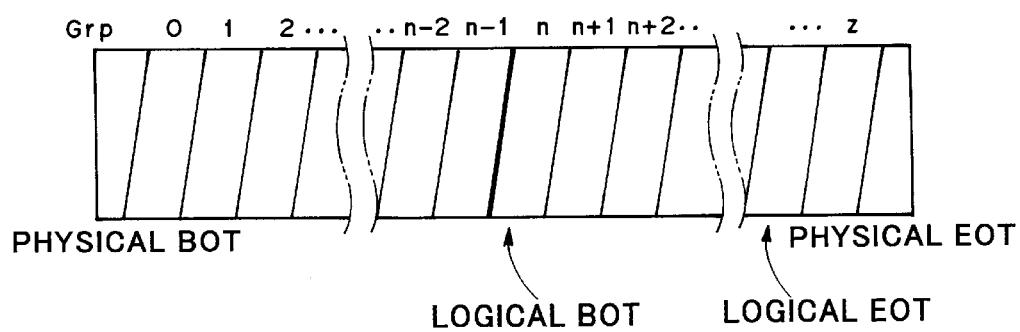
FIG. 4 is a schematic diagram showing an example of a data recording format on a magnetic tape according to a second embodiment of the present invention.

Next, with reference to the accompanying drawings, embodiments of the present invention will be described.

FIG. 1 is a schematic diagram showing the structures of a magnetic tape apparatus 10 and a magnetic tape cartridge 20 according to a first embodiment of the present invention. FIG. 2 is a schematic diagram showing an example of a data recording format on a magnetic tape according to the first embodiment of the present invention.

As shown in FIG. 1, according to the first embodiment, the magnetic tape cartridge 20 contains a memory 22 in addition to a magnetic tape 21. On the other hand, the magnetic tape apparatus 10 is provided with a controlling portion 11 and an accessing portion 12. The controlling portion 11 controls a writing process, a reading process, and so forth for data on the magnetic tape. The accessing portion 12 directly accesses data on the front surface of the magnetic tape 21 of the magnetic tape cartridge 20 that has been loaded.

The memory 22 of the magnetic tape cartridge 20 stores a predetermined type of system information and so forth. Data stored in the memory 22 is read and updated by the accessing portion 12 of the magnetic tape apparatus 10. In the magnetic tape apparatus 10 according to the first embodiment of the present invention, information of logical beginning of tape (logical BOT) of the magnetic tape is stored to the memory 22 of the magnetic tape cartridge 20 (the logical BOT will be descried later).

Referring to an example shown in FIG. 2, the magnetic tape according to the first embodiment, the helical scan recording method is used. The helical scan recording method is one of recording methods used for DAT and so forth. In the helical scan recording method, data is recorded in the helical direction of the magnetic tape.

In FIG. 2, group numbers $Grp_0$ to $Grp_z$ are assigned from the physical BOT to the physical EOT (End Of Tape) on the magnetic surface of the tape.

According to the present invention, as shown in FIG. 2, besides the physical BOT and the physical EOT, a logical BOT (Beginning of Tape) and a logical EOT (End of Tape) are assigned.

In FIG. 2, as the logical BOT, $Grp_n$ is assigned. At the preceding position of the logical BOT, $Grp_{n-1}$ is assigned as the logical EOT. At the beginning of $Grp_n$ that is the logical BOT, information thereabout is prewritten.

In such a manner, the magnetic tape is managed with two portions divided as a first portion from the logical BOT to the physical EOT and a second portion from the physical BOT and the logical EOT. In this example, logical positions of data recorded on the magnetic tape are successive from the end of the first portion to the beginning of the second portion. The magnetic tape apparatus 10 detects and accesses data of the magnetic tape in such a format.

The beginning group of the logical BOT ($Grp_n$ in the example shown in FIG. 2) is referred to as vendor group. In the vendor group, system information, information on number of times the tape was used, error rate, and so forth are recorded.

Since important information is recorded in the vendor group, it is accessed more times than the other portion of the magnetic tape. Thus, the portion of the vendor group is more quickly worn out on the magnetic tape than the other portion. However, in the magnetic tape apparatus 10 according to the first embodiment of the present invention, as will be described later, since the logical BOT (namely, the position of the vendor group) is automatically moved corresponding to the state of the tape and so forth, the particular portion can be prevented from being intensively accessed and thereby the life of the magnetic tape is prolonged.

Next, the process of the magnetic tape apparatus 10 according to the first embodiment of the present invention will be described. FIG. 3 is a flow chart for explaining the process of the magnetic tape apparatus according to the first embodiment of the present invention.

When the magnetic tape cartridge 20 is loaded to the magnetic tape apparatus 10, it reads the position of the logical BOT stored in the memory 22 and moves the tape until the logical BOT, and reads informant on the vendor group at the logical BOT (at step 301). When the magnetic tape apparatus 10 moves the tape until the logical BOT, the magnetic tape apparatus 10 also reads information on the logical BOT from the vendor group and checks whether or not the current position is really at the logical BOT.

In contrast, when the magnetic tape cartridge 20 is unloaded from the magnetic tape apparatus 10, unless the magnetic tape has been write-protected, the magnetic tape apparatus 10 writes updated information to the vendor group.

The magnetic tape apparatus 10 monitors the record quality of the tape (error rates of reading operation and writing operation), counts the number of times the tape was used (for example, the number of times the tape was loaded and the number of times the beginning of the tape was positioned with REWIND and SPACE commands), and records the counted result (at step 302). When at least one of the record quality and the number of times the tape was used exceeds respective threshold values (at step 303), the magnetic tape apparatus 10 prepares to move the logical BOT of the magnetic tape.

When data is written from the logical BOT (as writing is performed after rewinding or loading) or data is erased with the ERASE command, the magnetic tape apparatus 10 actually moves the logical BOT (at step 304). The magnetic tape apparatus 10 moves the logical BOT in a designated direction by a designated length (for example, moves the logical BOT for 10 groups) and then updates the logical BOT. Thereafter, the magnetic tape apparatus 10 starts writing data from the new logical BOT (at steps 305 and 306). At that point, the magnetic tape apparatus 10 erases information recorded at the position from which the logical BOT was moved and writes information of the vendor group to the updated logical BOT. In addition, the magnetic tape apparatus 10 updates the information on the position of the logical BOT stored in the memory 22 of the cartridge.

After the logical BOT is repeatedly has been moved, it reaches the end of the tape. At that point, the magnetic tape apparatus 10 returns the logical BOT to the physical BOT and continues to move the logical BOT.

As was described above, in the magnetic tape apparatus 10 according to the first embodiment of the present invention, the logical BOT (not limited to the physical BOT) of the magnetic tape is sequentially moved. Thus, the entire magnetic tape can be evenly and effectively used. Thus, the life of the magnetic tape can be prolonged.

Next, a second embodiment of the present invention will be described.

According to the first embodiment, as the logical BOT is moved, the logical EOT is moved to the preceding position of the logical BOT. However, the present invention is not limited to such a method. For example, as shown in FIG. 4, only the logical BOT is moved, and the logical EOT is not moved from the physical EOT.

In the method in which the logical EOT is moved corresponding to the logical BOT according to the first embodiment, the record capacity of the magnetic tape is constant regardless of the position of the logical BOT. However, as was described above, the magnetic tape is divided into two portions, one of which is from the logical BOT to the physical EOT and the other of which is from the physical BOT to the logical EOT. In contrast, according to the second embodiment of the present invention, since the logical EOT is not moved, the magnetic tape can be always managed with one area.

In addition, according to the second embodiment of the present invention, so as to prevent the record capacity of the magnetic tape from becoming too small, when the logical BOT has been moved a predetermined number of times, the logical BOT is returned to the physical BOT, instead of being moved to the next group. Thereafter, the logical BOT will be repeatedly moved from the physical BOT.

In addition, according to another embodiment of the present invention, all information recorded in the vendor group of the magnetic tape may be stored to the memory 22 of the cartridge. In this case, the magnetic tape apparatus 10 references the information stored in the memory 22. As a result, when the cartridge is loaded to magnetic tape apparatus 10, it need not reference the data of the vendor group. In this case, only when data of the vendor group is updated, the magnetic tape apparatus 10 accesses the vendor group recorded at the logical BOT.

According to the above-described embodiments, in the magnetic tape apparatus 10, like hardware, a function for updating the logical BOT and the logical EOT and other functions can be accomplished by software in such a manner that a computer program having each function is loaded to a memory of a computer processing apparatus. In this case, the computer program is stored to a record medium such as a magnetic disc or a semiconductor memory. The computer program is loaded from the record medium to the computer processing apparatus. With the computer program, the operation of the computer processing apparatus is controlled so as to accomplish each of the above-described functions.

As was described above, in the magnetic tape apparatus according to the present invention, the logical BOT (not limited to the physical BOT) of the magnetic tape is sequentially moved corresponding to the quality of data read from the magnetic tape, the number of times the data was accessed, and so forth. Thus, the entire magnetic tape can be evenly and effectively used.

In addition, even if an overwrite backup and load/unload operations are frequently repeated, a particular portion such as the physical BOT can be prevented from being intensively accessed. Thus, the entire magnetic tape can be evenly used. As a result, the life of the magnetic tape can be remarkably prolonged.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A magnetic tape apparatus for accessing a magnetic tape, said apparatus comprising:
    means for assigning a logical beginning of tape position on the magnetic tape and updating the logical beginning of tape position, said logical beginning of tape position being different from a physical beginning of tape position of the magnetic tape;
    means for recording system information to the logical beginning of tape position; and
    means for assigning a logical end of tape position on the magnetic tape and updating the logical end of tape position,
    wherein the logical end of tape position is adjacent to the logical beginning of tape position.

2. A magnetic tape apparatus for accessing a magnetic tape, said apparatus comprising:
    means for assigning a logical beginning of tape position on the magnetic tape and updating the logical beginning of tape position, said logical beginning of tape position being different from a physical beginning of tape position of the magnetic tape; and
    means for recording system information to the logical beginning of tape position,
    wherein an updated logical beginning of tape position is apart from the last logical beginning of tape in a predetermined direction by a predetermined distance.

3. A method for accessing a magnetic tape, the method comprising the steps of:
    assigning a logical beginning of tape position on the magnetic tape and updating the logical beginning of tape position, said logical beginning of tape position being different from a physical beginning of tape position of the magnetic tape;
    recording system information to the logical beginning of tape position; and
    assigning a logical end of the tape position on the magnetic tape and updating the logical end of tape position,
    wherein the logical end of tape position is adjacent to the logical beginning of the tape position.

4. A method for accessing a magnetic tape, the method comprising the steps of:
    assigning a logical beginning of tape position on the magnetic tape and updating the logical beginning of tape position, said logical beginning of tape position being different from a physical beginning of tape position of the magnetic tape; and
    recording system information to the logical beginning of tape position,
    wherein an updated logical beginning of tape position is apart from the last logical beginning of tape in a predetermined direction by a predetermined distance.

5. A computer program product for causing a computer to execute a method for accessing a magnetic tape, said method comprising the computer-implemented steps of:
    assigning a logical beginning of tape position on the magnetic tape and updating the logical beginning of tape position, said logical beginning of tape position being different from a physical beginning of tape position of the magnetic tape;
    recording system information to the logical beginning of tape position; and
    assigning a logical end of tape position on the magnetic tape and updating the logical end of tape position,
    wherein the logical end of tape position is adjacent to the logical beginning of tape position.

6. A computer program product for causing a computer to execute a method for accessing a magnetic tape, said method comprising the computer-implemented steps of:
    assigning a logical beginning of tape position on the magnetic tape and updating the logical beginning of tape position, said logical beginning of tape position being different from a physical beginning of tape position of the magnetic tape; and
    recording system information to the logical beginning of tape position,
    wherein an updated logical beginning of tape position is apart from the last logical beginning of tape in a predetermined direction by a predetermined distance.

* * * * *